United States Patent [19]

Smith

[11] Patent Number: 4,797,730
[45] Date of Patent: Jan. 10, 1989

[54] METHOD AND APPARATUS FOR CONTROLLING THE SAMPLING PHASE OF AN ANALOG COLOR TELEVISION SIGNAL

[75] Inventor: Terrance Smith, Redwood City, Calif.

[73] Assignee: Ampex Corporation, Redwood City, Calif.

[21] Appl. No.: 37,298

[22] Filed: Apr. 10, 1987

[51] Int. Cl.⁴ .............................................. H04N 9/475
[52] U.S. Cl. ...................................... 358/19; 358/326
[58] Field of Search ..................... 358/19, 17, 24, 326

[56] References Cited

U.S. PATENT DOCUMENTS

| | | | |
|---|---|---|---|
| 4,212,027 | 7/1980 | Lemoine | 358/314 |
| 4,301,466 | 11/1981 | Lemoine et al. | 358/13 |
| 4,352,121 | 9/1982 | Lilley | 358/326 |
| 4,400,720 | 8/1923 | Hinn | 358/19 X |
| 4,404,583 | 9/1983 | Tatami | 358/13 |
| 4,438,451 | 3/1984 | Hinn et al. | 358/19 X |

Primary Examiner—Howard W. Britton
Assistant Examiner—Victor R. Kostak
Attorney, Agent, or Firm—Wm. Marvin; George B. Almeida; Richard P. Lange

[57] ABSTRACT

A composite analog video signal is sampled at precise locations relative to the phase of the unmodulated color subcarrier along each horizontal line of the video signal. This provides a digitized signal with a constant phase relationship relative to the unmodulated subcarrier phase, which relationship may be used to remove sampling clock phase errors. The digitized samples are filtered by a digital bandpass filter to remove DC and second harmonic noise distortion. Two phase error measurements of the actual sampling clock phase are taken by averaging two sets of burst samples at 0° and 180° crossings, respectively, on selected horizontal lines. These phase error measurements are separately stored, and then are updated on selected alternate horizontal lines to cancel sampling nonlinearity errors. The updated signals are differenced to provide a phase error signal indicative of any sampling clock phase errors. The phase error signal is used to correct the phase of the sampling clock which is supplied to the sampling converter.

33 Claims, 9 Drawing Sheets

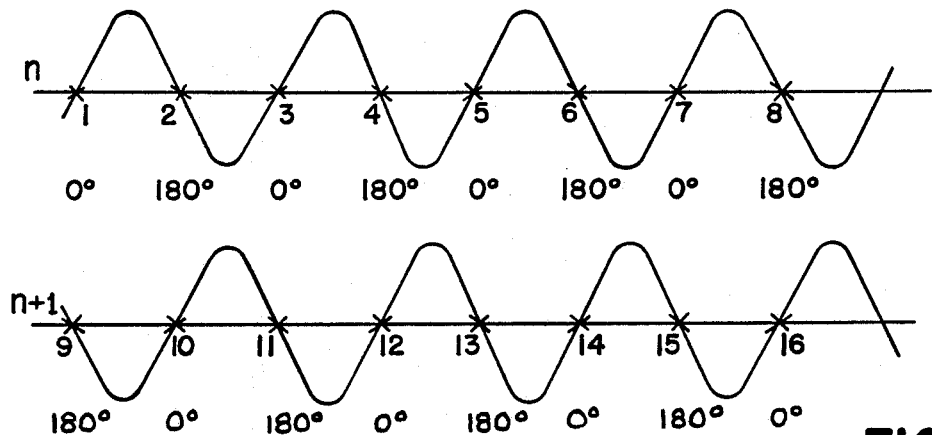

FIG. 4

| t | LATCH 170 | LATCH 174 | LATCH 176 | LATCH 18 | LATCH 20 |
|---|---|---|---|---|---|
| 1 | $S_1$ | $S_1+0$ | 0 | 0 | 0 |
| 2 | $S_2$ | $S_2+0$ | $S_1+0$ | 0 | 0 |
| 3 | $S_3$ | $S_1+S_3$ | $S_2+0$ | 0 | 0 |
| 4 | $S_4$ | $S_2+S_4$ | $S_1+S_3$ | 0 | 0 |
| 5 | $S_5$ | $S_1+S_3+S_5$ | $S_2+S_4$ | 0 | 0 |
| 6 | $S_6$ | $S_2+S_4+S_6$ | $S_1+S_3+S_5$ | 0 | 0 |
| 7 | $S_7$ | $S_1+S_3+S_5+S_7$ | $S_2+S_4+S_6$ | 0 | 0 |
| 8 | $S_8$ | $S_2+S_4+S_6+S_8$ | $S_1+S_3+S_5+S_7$ | AVERAGE | 0 |
| RESET | | 0 | 0 | AVERAGE | 0 |
| 9 | $S_9$ | $S_9+0$ | 0 | AVERAGE | 0 |
| 10 | $S_{10}$ | $S_{10}+0$ | $S_9+0$ | AVERAGE | 0 |
| 11 | $S_{11}$ | $S_9+S_{11}$ | $S_{10}+0$ | AVERAGE | 0 |
| 12 | $S_{12}$ | $S_{12}+S_{10}$ | $S_9+S_{11}$ | AVERAGE | 0 |
| 13 | $S_{13}$ | $S_9+S_{11}+S_{13}$ | $S_{10}+S_{12}$ | AVERAGE | 0 |
| 14 | $S_{14}$ | $S_{10}+S_{12}+S_{14}$ | $S_9+S_{11}+S_{13}$ | AVERAGE | 0 |
| 15 | $S_{15}$ | $S_9+S_{11}+S_{13}+S_{15}$ | $S_{10}+S_{12}+S_{14}$ | AVERAGE | 0 |
| 16 | $S_{16}$ | $S_{10}+S_{12}+S_{14}+S_{16}$ | $S_9+S_{11}+S_{13}+S_{15}$ | AVERAGE | AVERAGE |
| RESET | | 0 | 0 | AVERAGE | AVERAGE |

FIG. 5

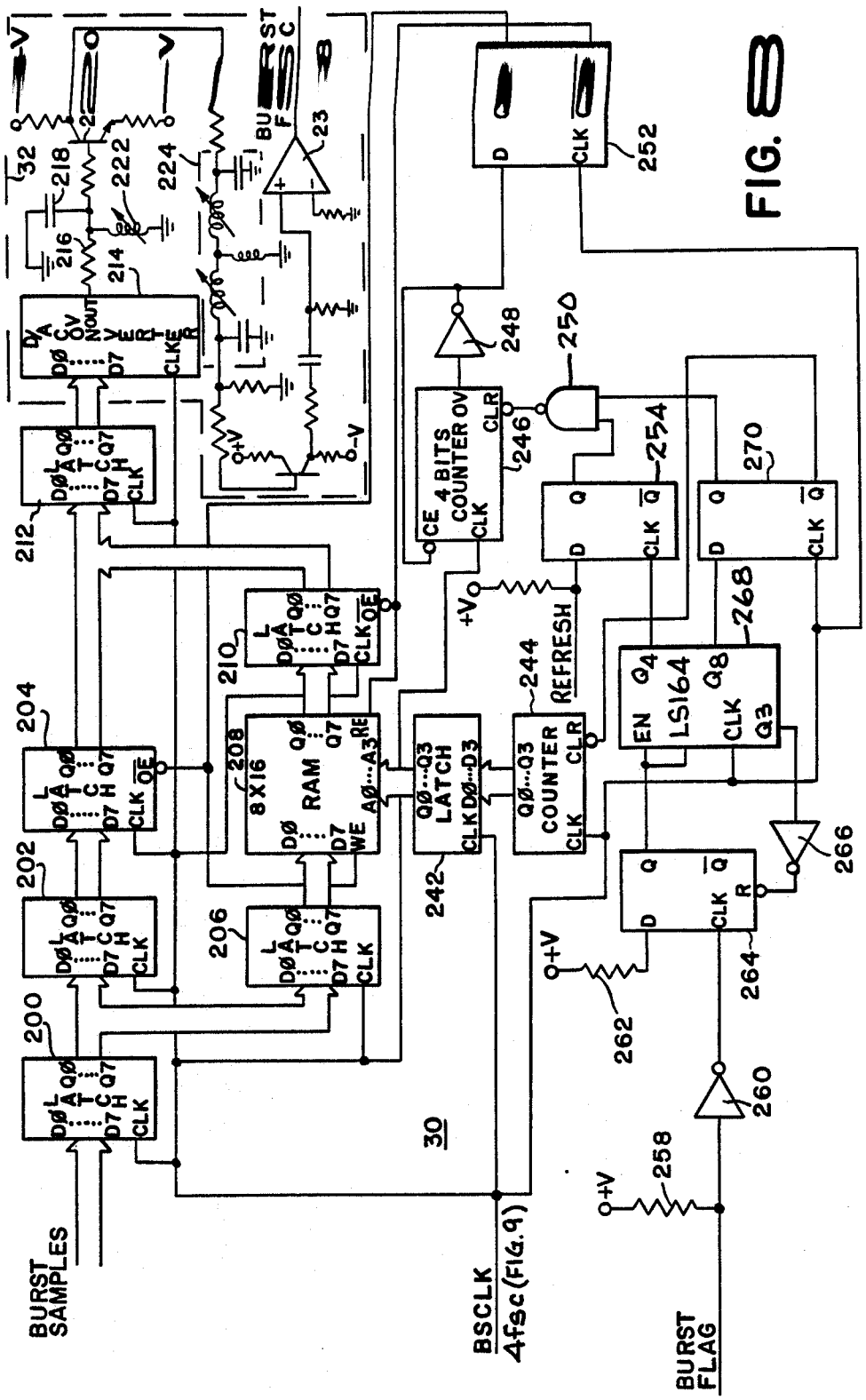

METHOD AND APPARATUS FOR CONTROLLING THE SAMPLING PHASE OF AN ANALOG COLOR TELEVISION SIGNAL

The invention relates generally to the accurate sampling of an analog color television signal, and more particularly to a method and apparatus for measuring the sampling clock phase error and utilizing the error measurement to reduce the sampling clock phase error to a minimum.

An analog composite color television signal is comprised of a plurality of components including a luminance component, chrominance component, subcarrier component, burst component, and horizontal and vertical blanking and synchronizing pulses. The analog composite video signal can be digitized by sampling it with an analog-to-digital (A/D) converter at a particular clock or sampling rate, usually some multiple of the subcarrier frequency, fsc. The advantages of such digitization of an analog color television signal for a magnetic tape recording and reproducing apparatus are more fully set forth in a U.S. Pat. No. 4,212,027 issued to M. G. Lemoine, which is assigned to the assignee of this application.

When digitizing an analog composite color television signal, the phase relative to the subcarrier component at which the digital samples are taken and the stability of that phase are important factors in recovering or reconstructing the composite analog signal from the digital samples. In the two prevalent color television standards, NTSC and PAL, the chrominance component of the analog composite color signal is a phase modulation of a subcarrier frequency. This phase information easily could be distorted or lost if a stable sampling phase were not established and maintained. Moreover, it is important that the sampling phase relative to the subcarrier frequency be a predetermined value so that the sampling phase is a known constant for use in the reproducing process. Phase shifts from the predetermined sampling phase, or instabilities in the sampling phase of a sampling clock, (sometimes referred to as phase jitter) will cause the analog composite color video signal to be sampled at the wrong location. Such errors in sampling will cause color imperfections in the reproduced signal which cannot be easily corrected, because the phase information of the chrominance component will be changed once these errors are introduced into the system. Thus, it is important that the sampling phase of the sampling clock for digitizing an analog color video signal remain stable and precisely positioned relative to the subcarrier component.

Conventionally, a relatively phase stable and positioned signal can be generated by a phase locked loop. The signal that it is desired to phase, such as the sampling clock of an A/D converter of an analog color video signal, is compared in a phase comparator against a reference signal with the correct or desired accurate phase. The phase comparator generates a phase error signal indicating the magnitude and direction by which the phase of the controlled signal differs from the reference signal. The phase error signal is applied to the control input of a phase shifter which nulls or servos the measured phase error to zero.

In such system, the reference signal corresponds to an unmodulated subcarrier which is generated on the "back porch" of the horizontal blanking signal as several cycles of burst. Thus, one method of generating a phased sampling signal for the A/D conversion of, for example, an analog composite video signal has been to generate an oscillator signal, generally at some multiple of the subcarrier frequency, generate a reference subcarrier signal from the burst waveform, and phase lock the oscillator signal to the reference signal in a phase locked loop. However, this analog method produces a sampling clock with a phase which drifts, and which cannot be locked with enough precision to a predetermined phase relative to the subcarrier. In addition, this system is sensitive to the amplitude or gain of the burst.

Others, notably Lemoine, as referenced hereinbefore, and Tatami in U.S. Pat. No. 4,404,583, have attempted to measure the actual phase of the sampling clock by examining digital samples of the burst waveform, or of the unmodulated reference subcarrier. The burst waveform is converted into several digital samples, by the same A/D converter which converts the rest of the video signal, at the actual sampling phase of the sampling clock. If the sampling clock is correctly phased, the burst samples should exhibit a predetermined relationship to each other, corresponding to that of the subcarrier waveform when it is at the desired sampling phase. Any variance from this relationship is detected as a phase error and is used to adjust the phase of the sampling clock until the predetermined relationship between the burst samples is restored.

This method assumes that the digital samples of burst are accurate conversions of the analog voltage representing subcarrier burst. However, any errors or imprecisions in the analog-to-digital conversion translate directly into errors in the measurement of the actual sampling phase and hence causes errors in the above technique of nulling the real error. There are a number of reasons for the imprecise phase measurement in these previous systems including major contributions by pedestal error, second harmonic error, analog-to-digital nonlinearity errors, system measurement drift, and noise errors. Thus this system also is sensitive to the amplitude or gain of burst. Accordingly, a system which reduces or eliminates any of these errors will produce a much more accurate phase error measurement.

Pedestal error is caused by the DC component of the analog signal on which the burst waveform is disposed. The pedestal or "back porch" of the horizontal blanking signal is not exactly a constant DC reference value along one horizontal, and can change from line to line. This variance can introduce errors into the measurement of the actual sampling phase when using the previously mentioned technique of sampling the burst waveform.

It is advantageous to sample the burst signal at the zero crossings of the sampling clock because such reference points are easy to detect and should coincide physically with multiples of the subcarrier frequency. However, the measurement of the burst waveform at or near its zero crossings is complicated directly by errors caused by the second harmonic of the subcarrier component signal, that is, the error at 2fsc in the NTSC color television standard. The second harmonic error directly affects the slope or gain of the waveform of the subcarrier at its zero crossings and thus affects the true value of a sample taken at that time.

Another error in the measurement of actual sampling phase is the nonlinearity of the analog-to-digital converter. When sampling the burst waveform (a sine wave) between its lowest value (at 270°) and the highest value (at 90°) on one line, or vice versa on alternate lines, the gain of the analog-to-digital converter will not be constant over the entire range. Even small nonlinearities in the range will insert errors in the phase measurement and cause error measurement distortions.

Noise is always a factor in the measurement of a signal and the measurement of the actual sampling phase can be distorted by such factor. It is not possible to filter out noise in the analog composite color signal at or below the frequencies that contain chrominance and luminance information without the loss of information. However, these noise components are still higher in frequency than the subcarrier and can cause errors in the conversion of the burst signal into its digital representation.

SUMMARY OF THE INVENTION

The invention provides a method and apparatus for overcoming the shortcomings of the techniques of previous discussion. To this end, it geneally is known that the burst data from an analog-to-digital (A/D) converter of the video system, in a NTSC color color television standard using a 4-times subcarrier (4fsc) sampling system, will have a repeating pattern if the sampling is in phase with the burst. The pattern is a simple one; data samples taken at the 0° crossings, and data samples taken at 180° crossings, will be equal. The invention contemplates accurately measuring this equality and then servoing the sampling phase to make the data samples equal, that is, to reduce the sampling phase error to zero.

In general, a plurality of sampling phase measurements are made at predetermined phases of the sampling clock. The relationship between the phase measurements are compared to determine if they differ from a predetermined relationship (such as the equality of previous mention) of corresponding phase measurements for the desired accurate phase of the sampling clock. The results of the comparison are used to adjust the phase of the sampling clock such that the analog color video signal is sampled at the desired accurate phase.

More particularly, the phase of the sampling clock of the analog-to-digital converter is measured by obtaining samples of the burst signal and determining from those converted samples the relative phase of the sampling with respect to the unmodulated subcarrier. The phase measurement includes processing the obtained samples to remove the distortions which have caused phase measurement errors in the past. In the preferred embodiment, means are provided for avoiding or eliminating errors introduced to phase measurement techniques, such as caused by analog-to-digital converter nonlinearity, pedestal level variances, second harmonic distortions, and noise.

The technique includes obtaining digital samples of several cycles of the burst reference waveform of each horizontal line of the video signal at regular intervals determined by a sampling clock. A plurality of the samples on a horizontal line of the same location and relative phase, for example, 0° crossing, are averaged together to obtain a first sampling phase measurement on the horizontal line. Another plurality of samples of another location and relative phase, for example, 180° crossing, are averaged in similar manner to obtain a second sampling phase measurement on the same line. The averaging of two separate sets of samples, with the samples of each set being taken from similar phase locations, reduces measurement and noise error by a factor dependent upon the number of samples averaged. The averaged sample values for each set of samples on a line then are temporarily stored. Each stored sample, representative of the sampling phase error, is measured every horizontal line, but only one phase error signal per line is updated. That is, on one line the 0° crossing average is updated, and on the alternate horizontal line the 180° crossing average is updated. Because of the normal 180° phase shift per line of burst, updating the averaged samples on alternate lines causes the phase error to be sampled by the same comparators in the A/D converter, and causes the phase error to be sampled at the same location on the horizontal line. Thus, the nonlinearity of the A/D converter is removed because the error caused by nonlinearity will cancel. The sets of averaged and updated sample values, each taken at respective predetermined locations, 180° apart, comprise two error signals which are then compared to each other with relational circuitry. The relational processing provides a phase error signal proportional to the difference between the sets of samples. This phase error signal is used to adjust the sampling clock to servo the two error signals to equality, whereby the sampling phase error is nulled or reduced to zero.

In a preferred embodiment, samples of the burst signal for each horizontal line are taken at a relative rate of 2fsc, and at the 0° and 180° phase of burst. As previously mentioned, if the sampling occurs at the desired accurate phase, the digital values of the two sets of samples taken at the positive and negative zero crossings, respectively, of the burst reference, should be equal. A plurality of the 0° samples, preferably four or more, are averaged on one line of a NTSC standard signal and a plurality of the 180° samples, preferably four or more, are averaged on the same line of the NTSC signal. The averages of each of these alternative line phase measurements temporarily are stored in respective phase measurement stores. The store contents are updated each horizontal line, but only one phase error signal per line is updated.

The averaged and updated sampling phase measurements are differenced to form a phase error signal proportional to the differences between the two measured and averaged sample sets. Because the sampling takes place at 0° and 180°, the relationship comparison should show the two sample phase measurements to be equivalent. Any difference between the phase measurements represents a phase error of the sampling clock. The phase error signal is integrated by an integrator which preferably has an integration constant of at least a video field in duration. The long time constant permits a stable clock which can be changed with precision by the integration signal without the introduction of jitter or other unwanted disturbances. However, a shorter integration constant provides corresponding lesser, but still advantageous operation as when correcting shorter term errors.

As another aspect of the invention, the digital burst samples are filtered by a digital filter before being averaged. The digital filter in this example, has a bandpass which removes frequency components at DC corresponding to the pedestal level, at the second harmonic (2fsc) corresponding to gain and slope changes of the signal at the zero crossings, and removes the drift of an analog filter. With these errors removed from the digital samples of burst, a much more accurate value of each sample can be provided for phase measurement. Preferably, the digital filter uses a sampling equation of the form:

$$Sf = \sum_{i=1}^{i=n} AiSi$$

where Sf is a filtered sample, i is the index number of the samples in an interval used for processing a filtered sample, Ai is a coefficient selected for the frequency response of the filter, and Si is a sample of the unfiltered signal.

In the preferred implementation the sampling rate of the sampling clock is 4fsc and the sampling interval is 4 cycles of burst or 16 samples. The frequency response of the filter is chosen by the following sampling equation:

$$Sf = -\tfrac{1}{2}Sf-4 + 0\,Sf-3 + Sf-2 + Sf-1 - \tfrac{1}{2}Sf0$$

where the filter is symmetrical about the center value, with the two outside weighting coefficients being $-\tfrac{1}{2}$, the next two weighting coefficients being zero, and the center coefficient being 1. This equation, included herein by way of example only, generates a bandpass frequency response which has a maximum pass value (pole) at fsc and maximum attenuation values (zero) at DC and 2fsc.

It is to be understood that the invention works not only with a NTSC standard but works as well with a PAL color television standard. Use with PAL requires that the error signals are sampled on every other horizontal line (which are 180° apart in phase), and are updated at every fourth line rather than being updated on alternate lines as in the NTSC standard described herein.

These and other features, and advantages of the invention will become apparent upon reading the following detailed description in conjunction with the attached drawings.

BRIEF DESCRIPTION OF THE DRAWINGS

FIGS. 4A,B are a pictorial representation of sampling phases of cycles of the burst signal on alternating horizontal lines;

FIG. 5 is a tabular representation of the contents of particular components in the burst phase measurement circuitry and in the A and B phase stores of FIGS. 1 and 2;

FIG. 8 is an electrical schematic of the burst store and fsc generator of FIG. 1;

DETAILED DESCRIPTION OF THE PREFERRED EMBODIMENT

Figure 1:
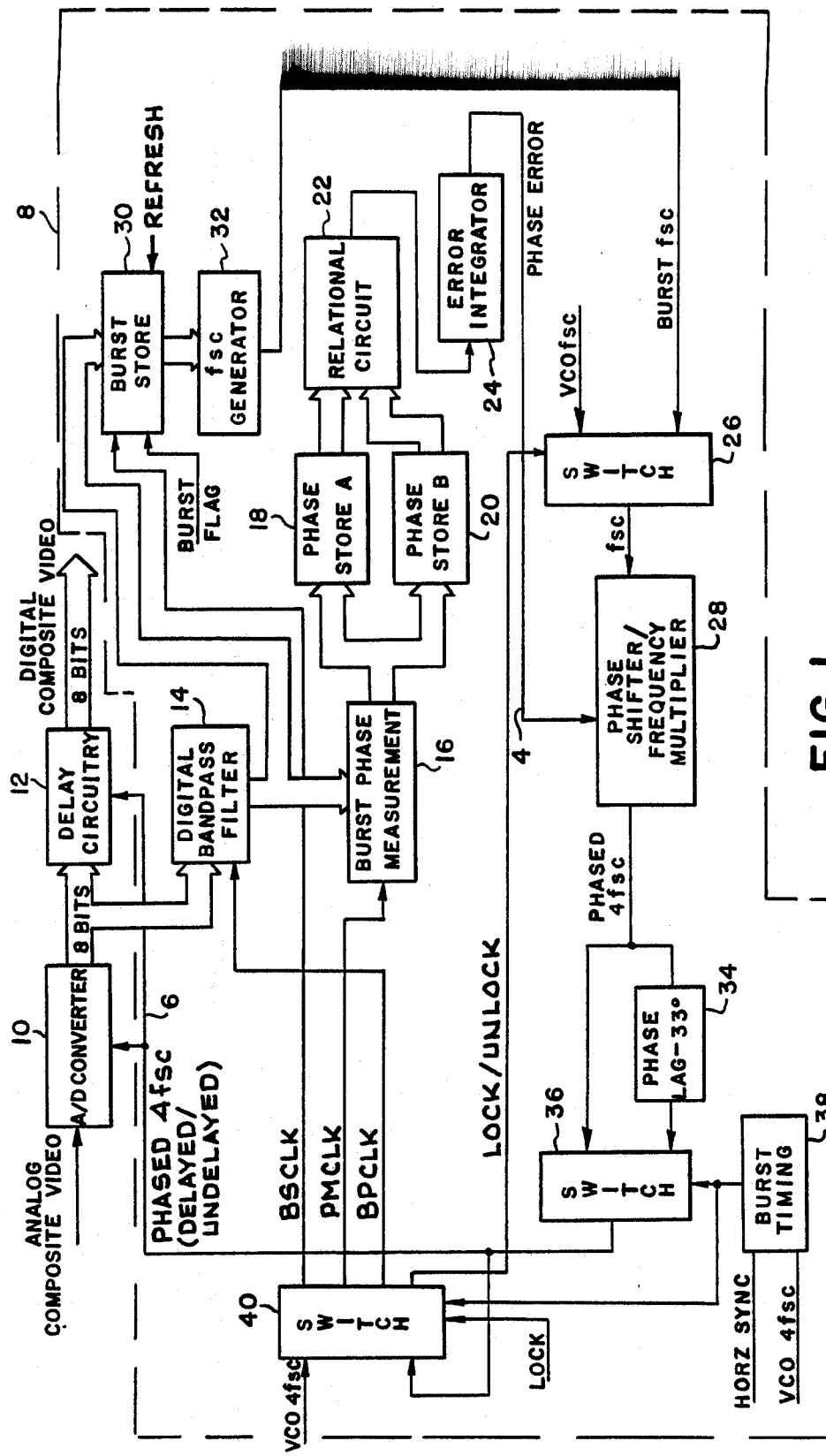
FIG. 1 is a system block diagram of an A/D clock circuit for digitizing an analog composite color video signal into a digital composite color video signal, at the sampling phase of a sampling clock generated by a clock generator in accordance with the invention.

In FIG. 1 there is shown an apparatus for converting an analog composite color television (video) signal into a digital composite color television signal. The analog composite color television signal on a line 7 is sampled, at a specific sampling rate and phase with respect to its unmodulated subcarrier component, by the output signal of a sampling clock generator 8 in accordance with the invention. The clock generator 8 provides a sampling clock signal on a clock line 6, causing an analog-to-digital (A/D) converter 10 to sample the analog composite video signal and convert it to a series of digital samples. The sampling is done at a nominal rate of 4 fsc commensurate with the NTSC color television standard, and generates 8-bit digital samples corresponding to the amplitude of the analog composite video signal at the time of conversion. The digital samples are transmitted through delay circuitry 12 which provides a digital composite video signal which then may be digitally processed by downstream apparatus (not shown) and finally reconverted by a digital-to-analog (D/A) converter into a reproduction of the original analog signal.

To facilitate the description, the invention is described herein in the environment of a NTSC color television standard, using an analog composite television signal, and using a 4fsc burst sampling rate. It is to be understood that the invention contemplates use in other television standards, such as the PAL standard of previous discussion, and further may be used in conjunction with a component television signal system, as further discussed hereinafter. Further, the invention works equally well in systems having data sampling rates other than 4fsc. A required condition is that the sampling clock rate generates a digital pattern or relationship in burst that is readily correctable.

As mentioned previously, the invention provides the highly desirable advantage of precisely controlling the sampling phase of the A/D converter 10 which performs the sampling of the analog composite video signal depicted on line 7 of FIG. 1. To this end, the sampling clock signal on clock line 6 is the output of a switch 36 which receves, at one of its terminals, a phased 4fsc clock signal. The other input of switch 36 is a delayed version of the phased 4fsc clock signal. The phased 4fsc clock signal is the output of a phase shifter/frequency multiplier circuit 28, which receives as its input an unphased clock signal at the frequency fsc. The frequency multiplier of circuit 28 provides a phase shift correction in response to a phase error signal developed on a line 4 and also multiplies the unphased fsc signal to 4fsc. The phase error signal is generated in phase measurement circuitry, which selectively samples the output of the A/D converter 10 and measures the phase error between two sets of samples to sense a phase difference indicative of the amount of sampling phase error. The phase shifter/frequency multiplier circuit 28 servos the sampling clock with the phase error signal, in accordance with the invention. This procedure nulls any phase difference, such that the phased 4fsc sampling clock supplied on line 6 is at the precise desired phase.

In the preferred embodiment, four or more samples of the burst signal are sampled at, for example, the 0° crossings of burst on a horizontal line, and four or more samples of the burst signal are sampled at, for example, the 180° crossings of burst, for the same line. Although four samples are averaged in the description herein, the number of samples may be two, three, or greater than four. In general, the greater the number of samples averaged, the greater the noise reduction. The samples are supplied to the phase measurement circuitry of the clock generator circuit 8, which includes a digital bandpass filter 14 with a frequency response which removes the DC and 2 fsc frequency components from the samples of the converted analog composite video signal, and is further exemplified in FIG. 6. Such frequency components, if not removed, will contribute to the error in the measurement of the phase of the burst signal as previously discussed.

The filtered burst samples are applied to a burst phase measurement circuit 16 which digitally averages the plurality of burst samples taken at the 0° crossings together to obtain a first digital sampling phase measurement, or signal. Likewise, the samples taken at the 180° crossings are averaged together in circuit 16 to provide a second digital sampling phase measurement or signal. These digital sampling phase signals are stored in an A phase store 18 and a B phase store 20, respectively. The digital value in A phase store is representative of the actual sampling phase of the analog composite video signal with respect to the unmodulated subcarrier, and the digital value in B phase store also is representative of the actual sampling phase of its respective signal, but 180° apart in phase. The two stores are used to allow separately storing the digital values corresponding to the two sets of averaged samples, and to allow subsequently updaing the averaged sample values on alternate lines to effect nonlinearity error cancellation. A relational circuit 22 coupled to the phase stores 18, 20, includes a differencing circuit, and determines from the two sets of sampling phase measurements whether the values thereof are equal, that is, correspond to the value which is obtained if the samples are taken at the desired precise sampling phase.

More particularly, the relational circuit 22 in the present implementation, includes circuitry which reads the digital values from A phase store 18 and B phase store 20, converts the digital values to analog signal, and compares them together. If there is a difference in sampling phase it is sensed by the relational circuit 22 which functions as a differencing circuit. That is, if there is an output from the differencing circuit that is not a nullity, it indicates that there is a phase error existing between the actual sampling phase of the A/D converter 10 and the desired sampling phase. This phase difference signal is supplied as an analog value to an error integrator 24 which integrates the error to produce a PHASE ERROR signal indicative of the actual sampling phase error. The PHASE ERROR signal is supplied via the line 4 to shift the phase of the fsc signal by means of the phase shifter/frequency multiplier circuit 28, to eliminate the phase difference sensed by the relational circuit 22.

The PHASED 4fsc clock signal from the phase shifter/frequency multiplier circuit 28, and the delayed version thereof, are supplied to the two input terminals of the switch 36, and are switched to the output in response to a logic signal from a burst timing circuit 38. The burst timing circuit 38 receives a horizontal sync signal, HOR SYNC, and an oscillator signal at nominal 4fsc frequency from a voltage controlled oscillator (VCO) (FIG. 11), and generates a time interval in which a burst signal will occur during a horizontal line, if present. This signal is used to switch the PHASED 4fsc sampling clock from a zero phase relationship with the unmodulated subcarrier, i.e., in phase with the burst, to the PHASED 4fsc clock after it has a phase lag of −33° inserted therein by phase delay circuit 34. The latter circuit provides for servoing the PHASED 4fsc clock to a desirable phase of the subcarrier, for example, where it lags it by 33°, to be able to sample the analog video signal on the I and Q axes, which has advantages in the NTSC standard. Since the technique is generally known and is not, per se, a part of this invention, it is not further described herein. Suffice it to say that during the burst interval, the switch 36 is operated such that the delay circuit 34 is switched into the sampling clock path, and the burst waveform on the "back porch" of the horizontal blanking pulse is sampled at −33° phase in response to the sampling clock. This switching allows the actual sampling phase of the burst waveform to be more accurately measured, while permitting the video portion of the composite signal to be sampled at a different phase that may be advantageous in further video processing.

Another switch 40 receives the PHASED 4fsc sampling clock on clock line 6 and provides internal clocking signals including PMCLK pulses for the burst phase measurement circuit 16, BSCLK pulses for a burst store 30, and BPCLK pulses for the bandpass filter 14. In general, during the burst interval defined by the burst timing circuit 38, the PHASED 4 fsc sampling clock on line 6 is gated through the switch 40. If the phase error is small and the servo is working to null the error, the system is termed "locked". Alternatively, if the phase error is too large for the A/D sampling clock to be substantially in phase with the burst error, the system is termed "unlocked". The present circuit provides means for using the input burst to determine the sampling phase when the VCO of previous mention is locked to subcarrier. However, when the circuit is unlocked, burst store circuitry is used to obtain phase sampling until the VCO locks up again. The locked/unlocked condition is detected in the VCO circuitry (FIG. 11) which then applies a logical state to the switch 40 via a LOCK signal. When the unlocked condition is present, the corresponding logic state of the LOCK signal causes the switch 40 to gate the VCO 4fsc signal to shift accordingly the origin of the internal clock signals. The alternate clocking of the phase measurement circuitry and burst store 30 when the VCO is unlocked, is accomplished using the BURST fsc clock supplied by the fsc generator 32 and a switch 26, until the circuitry becomes locked again. The VCO 4fsc clock and the PHASED 4fsc clock, are gated through switch 40 to provide the BSCLK PMCLK and BPCLK clock pulses only during the burst interval as determined by the burst timing circuit 38.

The internal clock pulses, BSCLK, are used to store digital samples of the burst signal in burst store 30 after a BURST FLAG signal has occurred at the 4fsc rate, indicating the start of the burst interval. The BURST FLAG conventionally is supplied from the input video processing circuits in the system during the horizontal blanking interval. The digital samples of burst are clocked out of the burst store 30 to the fsc generator 32 which provides the digital BURST fsc signal to the switch 26, in phase with the stored burst samples. During the burst interval, if the system is unlocked, switch 26 will select the BURST fsc signal as the basis of the PHASED 4fsc signal. When the system is locked, the switch 26 selects the VCO fsc signal supplied thereto as the basis for the PHASED 4fsc signal.

Figure 3:
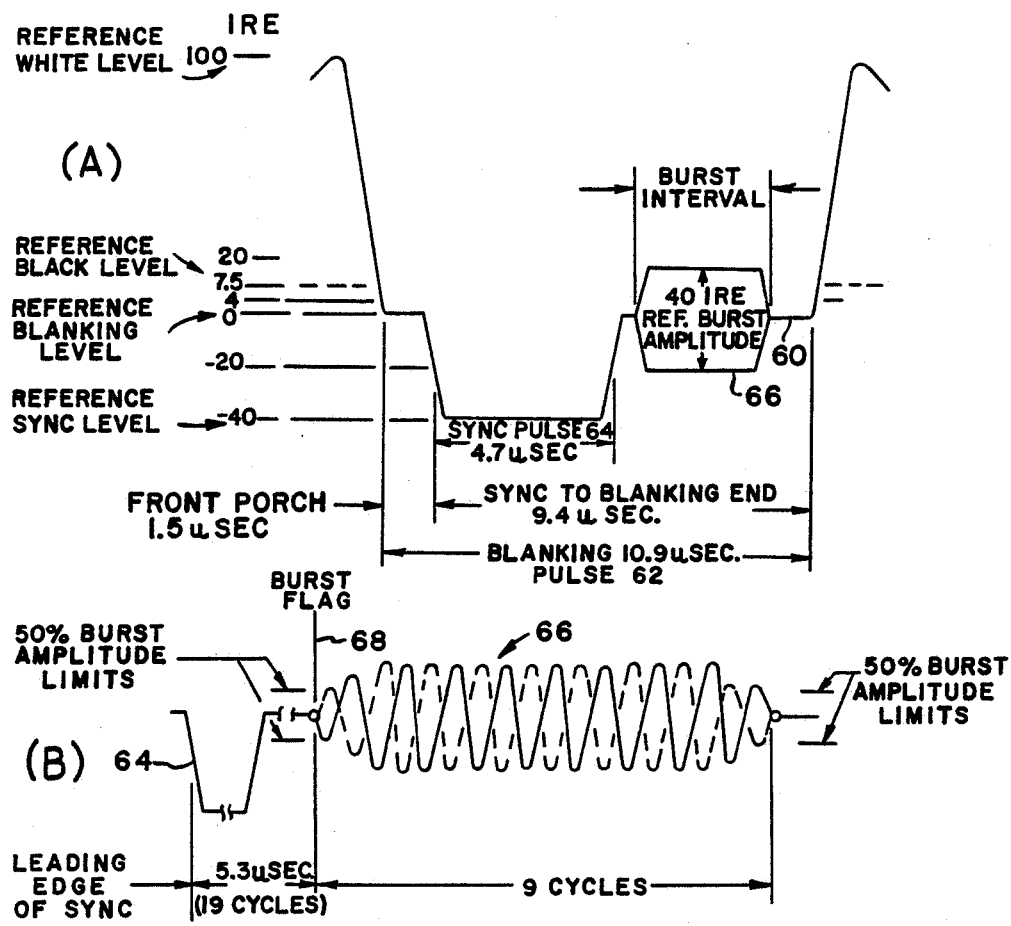
FIGS. 3A,B are a set of conventional waveform diagrams illustrating the burst signal which is superimposed upon the blanking pulses of an analog composite color video signal.

By way of general background information, the burst waveform for a NTSC standard composite color television signal is illustrated in FIGS. 3A,B. The burst signal waveform 66 is positioned on the back porch 60 of the horizontal blanking pulse 62 which initiates every horizontal line. The back porch 60 in turn follows the horizontal sync pulse 64 and is at a reference blanking level of 0 IRE units in amplitude, wherein the reference white level is 100 IRE units. The burst signal wavefor 66 has a positive and negative going amplitude of 40 IRE units centered about the 0 IRE reference blanking level, that is, the back porch 60 pedestal value. The burst waveform 66 is generally nine cycles of a sine wave at the reference subcarrier frequency of 3.58 MHz. The phase of the burst 66 measured from the first zero crossing after an interval of 5.3 microseconds from the leading edge (50% amplitude point) of the horizontal sync signal. In accordance with the NTSC standard, the initial point of the burst waveform 66 is approximately 19 subcarrier cycles after the leading edge of the horizontal sync pulse 64. The initial zero crossing of the burst is negative going on one horizontal line and positive going on the alternate horizontal line.

It is conventional in the art to detect the leading edge of the sync pulse 64 and to provide a horizontal sync signal HOR SYNC to indicate that point of the waveform. Further, it is within the ordinary skill of the art for a signal system to supply the BURST FLAG 68, indicating the beginning of the burst waveform 66 (FIG. 3B). These signals are used for timing purposes by the present circuitry, as discussed in FIG. 1.

Figure 10:
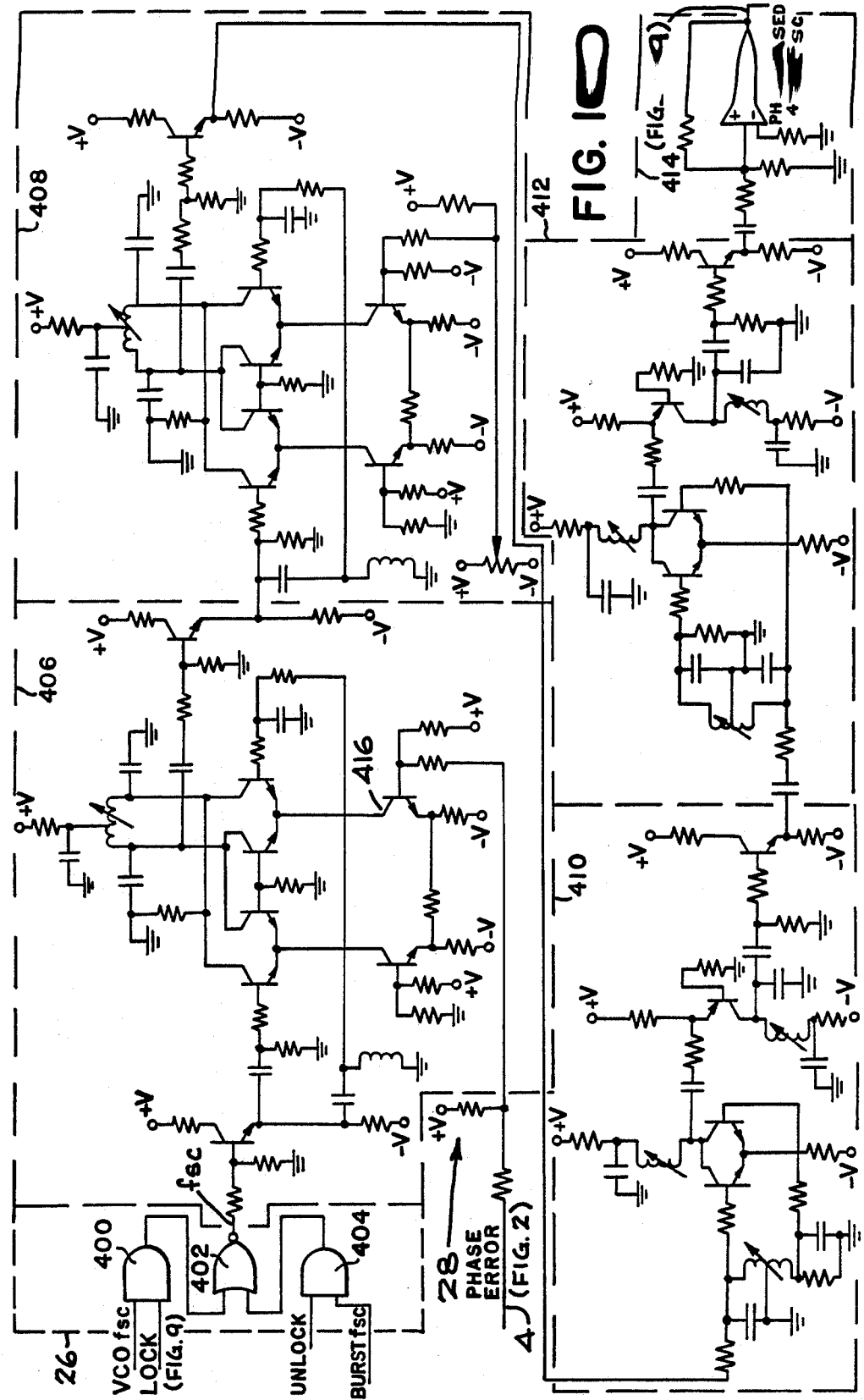
FIG. 10 is a detailed electrical schematic of the phase shifter/frequency multiplier circuit of FIG. 1.
Figure 11:
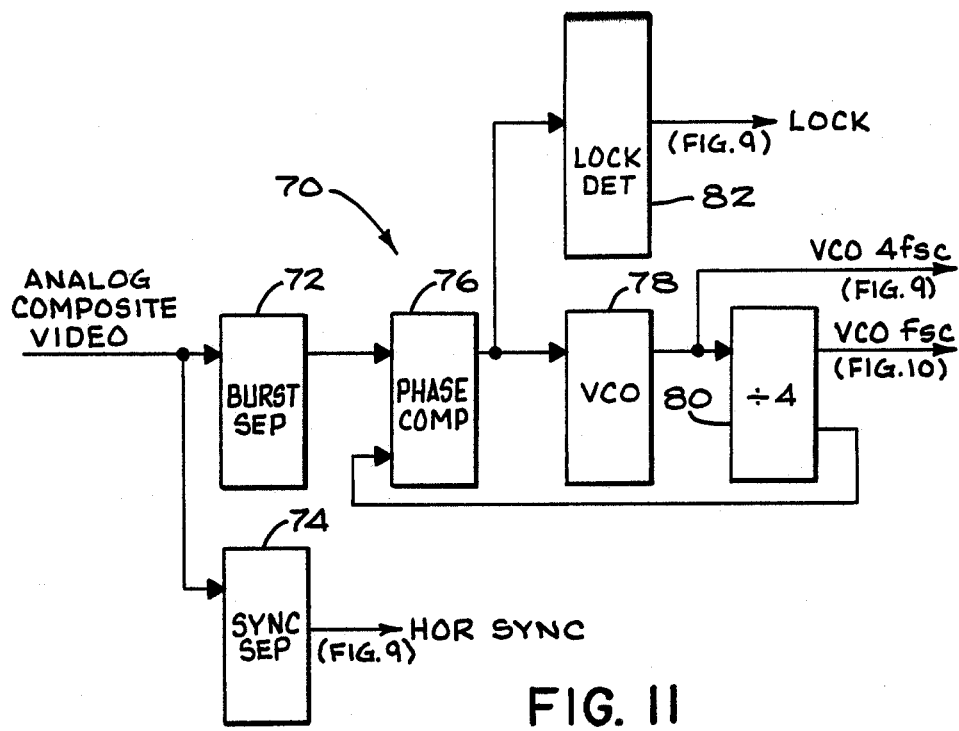
FIG. 11 is a block diagram of voltage controlled oscillator circuitry for supplying a lock/unlock signal, and various timing signals used in the circuits of FIGS. 9 and 10.

FIG. 11 depicts by way of example, a generally conventional VCO circuit 70 for supplying the LOCK signal, and the horizontal sync and reference subcarrier signals, of previous mention in FIG. 1. The analog composite video signal is supplied via the line 7 to a burst separator 72 and to a horizontal sync separator 74. The sync separator 74 supplies the HOR SYNC signal to the burst timing circuit 38 of FIGURES 1,9. The burst separator 72 supplies the burst signal to a phase comparator 76, which is coupled in turn to a voltage controlled oscillator (VCO) 78. The VCO 78 supplies the VCO 4fsc reference clock, locked to the burst subcarrier, to a divide-by-4 circuit 80, as well as to the VCO 4fsc inputs in the burst timing circuit 38 and the switch 40, of FIGS. 1,9. The divide-by-4 circuit 80 is coupled back to the phase comparator 76 to close the VCO loop, and also provides a VCO fsc reference clock to the switch 26 of FIGS. 2,10. The phase comparator 76 output also is fed to a lock detector circuit 82 which detects the locked/unlocked condition of the VCO circuit and supplies the LOCK signal logical state indicative of the condition, to the switch 40 of FIGS. 1,9. Thus, when the VCO circuit 70 is locked, the lock detector circuit 82 supplies a high logic state, and supplies a low logic state when the VCO circuit is unlocked.

Figure 2:
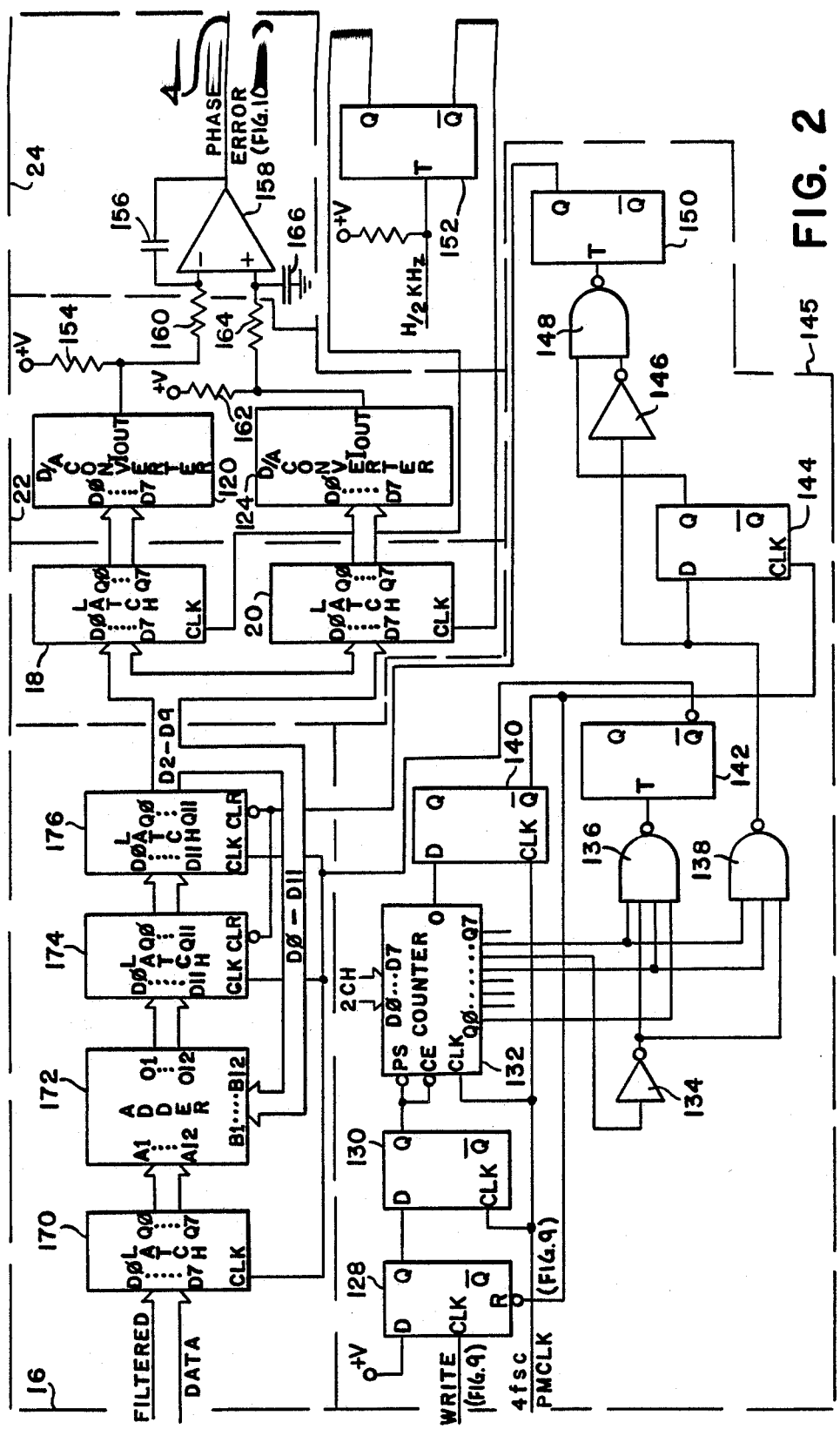
FIG. 2 is an electrical schematic diagram of the burst phase measurement circuit, A and B phase stores, relational circuit, and error integrator of FIG. 1.

FIG. 2 discloses more detailed circuitry illustrating, by way of example, an implementation of the phase measurement and the phase error signal generating circuitry of previous discussion in FIGURE 1. The phase measurement circuit 16 of FIG. 1, includes a serial arrangement of a latch 170, an adder 172, a latch 174, and a latch 176. This circuitry is used to calculate an average of four samples taken from either the positive going zero crossings or negative going zero crossings of the burst waveform 66 of FIGS. 3A,B, as further described below. The averages of these samples are supplied from the Q0–Q11 outputs of the latch 176, and are transferred on alternating horizontal lines to the pair of latches 18 and 22 comprising the A and B phase stores, respectively. Each latch 18 and 20 stores a digital number corresponding to the sampling phase signal, which then is converted to analog values by respective D/A converters 120 and 124 corresponding to the relational circuit 22 of FIG. 1. These analog values are fed to an integrating operational amplifier 158 corresponding to the error integrator 24 of FIG. 1, and are compared. The integrated difference of the analog values is supplied from the output of the integrating operational amplifier 158 via the line 4, as the phase error signal of previous mention.

A measurement timing circuit 145 provides clock signals at precise phase locations to allow latch 170 to sample eight zero crossings of the burst waveform of each horizontal line; four each at the 0° and 180° relative phases of the burst. The clock output from the *Q output of a monostable 142 is nine pulses, which move the burst samples through the latch 170, adder 172, latch 174, and latch 176 to produce the averaging. (The asterisks herein denote the not-true state shown as a bar in the drawings.) These pulses coincide with the 0° and 180° phase of the sampling clock and load each burst sample into latch 170 at the respective zero crossing of the burst signal.

To provide averaging, each burst sample which is clocked into the D0–D7 inputs and latched onto the Q0–Q7 outputs of latch 170, is thereafter input to the A1–A12 inputs of a 12-bit adder 172. This sample value is added to another 12-bit addend from the Q0–Q11 outputs of the latch 176. The addends A1–A2 and B1–B12 are added in the adder 172, and their sum is transferred from outputs 01-012 to the inputs D0–D11 of the latch 174. On the next clock pulse the accumulated sum in latch 174 is transferred to the inputs of latch 176. Therefore, each incoming burst sample is added to a sample averaged two clock periods earlier which, for a 2fsc clock, will cause positive zero crossings (at 0%) to be added together and negative zero crossing (at 180°) to be added together. The results of the addition of four samples for the positive zero crossings will be contained in one latch 174, and the results of the addition for the negative zero crossings will be contained in the other latch 176. Whether an accumulation is in one latch or the other depends upon the relative phase of the burst subcarrier on that particular horizontal line.

The first zero crossing will either be positive or negative, and the average of the set of samples for that location of 0%, or 180°, will be contained in the latch 176 at the end of sampling the burst waveform 66 for that line. On the next line, the alternate zero crossing average of the corresponding set of samples will be stored in the latch 176. By alternating the transfer of the composite sample from latch 176 to the latches 18 and 20, the positive zero crossing phase measurement is updated during one line period and the negative zero crossing phase measurement is updated on the next line, as previously discussed. The contents of the latches 174 and 176 are cleared by the Q output of a monostable 150 (as further described below), after the average of the contents of latch 176 are transferred to one of the latches 18 or 20. This provides clearing of the A and B phase stores, which has the effect of clearing the adder 172 inputs, allowing the full value of the next two samples to be added in turn to the following samples. That is, the stores are cleared whereby zero is added to the first two burst samples taken from the next horizontal line.

The averaging is accomplished by recognizing that the contents of latch 176 are a 12-bit number which represents the accumulation of four data samples. The average is this 12-bit number divided by four. This division is accomplished in hardware by bit shifting the 12-bit number towards the least significant bit (LSB) of the number, which is done by transferring the middle 8-bits D2–D9 of the 12-bit output to the inputs of the latches 18 and 20. It is evident that more or less than four samples can be averaged in this manner over one or more horizontal lines.

The phase measurements stored in the latches 18 and 20 are, therefore, digital numbers each representative of the actual phase of the sampling clock relative to the burst. As previously discussed, it is known that such phase measurements have a redetermined relationship to each other. In the example herein, the relationship dictates that the digital phase values in latches 18 and 20 should be equal if the sampling clock is correctly phased with burst. To determine this relationship, the outputs Q0–Q7 of latch 18 are applied to the inputs D0–D7 of the D/A converter 120 of the relational circuit 22. The D/A converter 120 converts the digital number corresponding to the phase measurement into a current from the junction of two resistors 154 and 160. Because the resistors 154, 160 are tied to a positive voltage +V, a voltage representing the digital number is applied to the inverting input of the operational amplifier 158, which defines the error integrator 24 of FIG. 1.

Similarly, the digital number stored in latch 20, corresponding to the phase measurement value, is fed to the inputs D0–D7 of the D/A converter 124 of the relational circuit 22, which converts the digital word into a current from the junction of resistors 162 and 164. Because the resistors 162 and 164 are connected to a source of positive voltage +V, a voltage representing the second digital number is fed to the noninverting input of the operational amplifier 158. The operational amplifier 158, with a capacitor 166 and a capacitor 156, is configured as an balanced integrator. Thus, the difference between the phase measurement voltages is integrated over the time constant of the amplifier. Preferably, the time constant is relatively large in relation to the sampling clock of the video signal and, by way of example, is at least the duration of a field in the preferred embodiment. The values of resistors 154, 160, 162, 164, and capacitor 156 are chosen such that the integrating operational amplifier 158 responds at unity gain at the field rate of the video signal. A long integration time allows the system response to move forward and correct a long term error, if there is one, rather than attempting to continuously change the phase of the clock, which causes hunting and instability. However, a smaller time constant also affords advantageous operation, in that it would correct shorter term errors, and may be used instead.

When processing a monochrome signal, the capacitor 156 is discharged and the balanced integrator amplifier 158 is held at unity gain. This results in a phase error signal on line 4 which generates a fixed delay of clock phase.

The analog differencing/integrating circuitry depicted in FIG. 2 provides an optimum operating range, stability and resolution, and thus is a preferred implementation. However, digital circuitry may be employed and is further described herein in FIG. 12 below.

In a further implementation, microprocessor means may be used to compare the two phase error values. This allows a non-linear phase correction slope, and allows for even greater noise reduction. The microprocessor scheme is arranged whereby large phase errors generate fast phase changes, and small errors generate slower phase changes.

The measurement timing circuit 145 receives, at the CLK input of a D-type bistable 128, a delayed WRITE pulse from circuitry in the burst timing circuit 38 described in FIG. 9 below. The delayed WRITE pulse initiates counting 4fsc clock pulses with a counter 132 via a bistable 130, until four full cycles of the subcarrier burst waveform have been counted. The delayed WRITE pulse causes the bistable 128 to transfer the positive voltage on its D input to the D input of the bistable 130. This positive voltage, or high logic level, is delayed one clock interval through the bistable 130 before it presets the counter 132 to hexadecimal 2C. Thus, the counter 132, which is an 8-bit counter, will count from that number until it overflows from its O output to set a D-type bistable 140. The setting of the bistable 140 causes a signal from its *Q output to reset the bistable 128 and disable the counter 132 one clock pulse later. The counter 132, therefore, in response to the delayed WRITE pulse, counts in 4fsc clock pulses for four cycles of the subcarrier burst. The counter 132 is used herein to meet the speed requirements of the PAL standard, otherwise the counter may be replaced with circuits such as monostables. A NAND gate 136 decodes the outputs of the counter 132 to generate sample phases, corresponding to the 0° and 180° phase locations of the sampling clock, and causes the monostable 142 to be triggered at a 2fsc rate. This selects the zero crossings of the burst waveform at 0° and 180° of the sampling clock. Another NAND gate 138 decodes the counter signal at the end of the subcarrier burst sampling and supplies a signal output to one input of a NAND gate 148 via an inverter 146, and also sets a D-type bistable 144 in coincidence with the 4fsc clock signal from bistable 140, to enable the output of the NAND gate 148. The output of the NAND gate 148 causes the clear signal from the Q output of the monostable 150, which clears the contents of the latches 174 and 176 as previously described.

A monostable 152 is supplied with a signal H/2 corresponding to ½ the line rate of the system, and alternately clocks the latches 18, 20 with H/2 clocks via the Q and *Q outputs, respectively, to provide the updating of the store contents on alternate lines.

To further illustrate the operation of FIGURE 2, FIGS. 4A,B show portions of burst waveform cycles on adjacent horizontal lines n, n+1. It is noted that burst on line n is 180° out-of-phase from burst on the alternating line n+1, which corresponds to the conventional 0° to 180° phase relationship of subcarrier to horizontal sync on alternate lines of video in the NTSC color television standard. Samples S1, S3, S5, and S7 are positive zero crossings and correspond to one set of samples which are averaged together, and samples S2, S4, S6 and S8 are negative zero crossings on line n and are another set of samples to be averaged together. Likewise, samples S10, S12, S14, and S16 are positive zero crossings, while samples S9, S11, S13, and S15 are negative zero crossings on alternate line n+1. It may be seen, that if the averaged sets of samples are updated on alternate lines, similar averaged samples occur at the same place, but at opposite phase, whereby sampling non-linearity errors will cancel.

Although the data rate via the A/D converter 10 is at 4fsc, the sampling of the burst error information is at 2fsc because burst is sampled only at the 0° and 180° crossings of burst.

FIG. 5 illustrates in tabular form the contents of the latches 170, 174, 176, 18, and 20 during different time periods t1 through t16 corresponding to the sample periods of the phase measurement clock. It is seen that the average of samples S1, S3, S5, and S7 may be transmitted to latch 174 prior to the reset of latches 174, 176 after sample time t8, and that the average of samples S9, S11, S13, and S15 is transferred to the latch 20 before the reset after time t16. In its present configuration the phase measurement circuitry uses only the lower eight time periods t9-t16. An average of four samples of the positive zero crossings are stored in latch 18 and an average of four samples of the negative zero crossings are stored in latch 20. It is evident that this technique can be expanded by taking an average of more than four zero crossings of a particular type on one line, or by adding a number of zero crossings from alternate lines.

Figure 6:
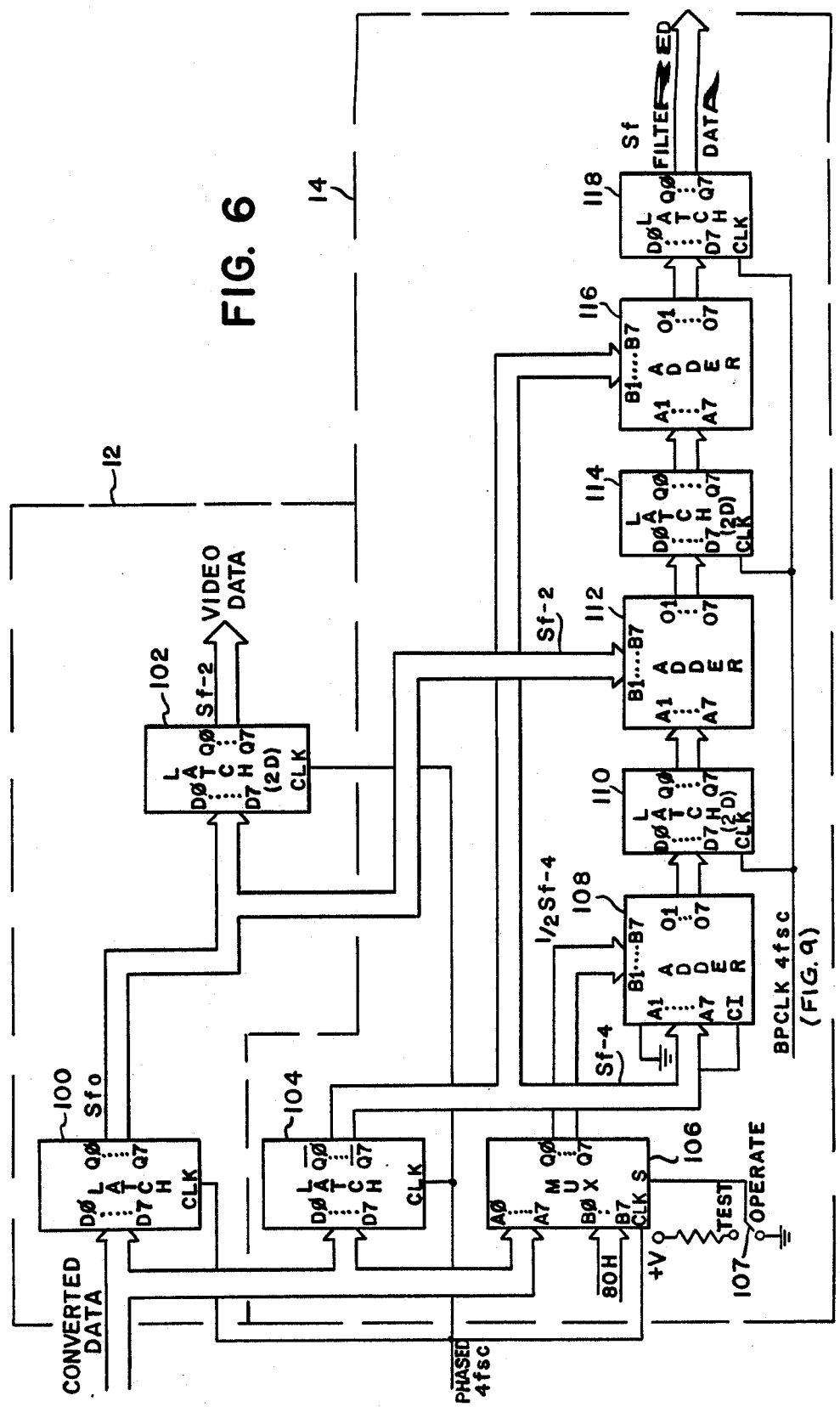
FIG. 6 is an electrical schematic of the delay circuitry and the digital bandpass filter of FIG. 1.

FIG. 6 is a detailed electrical schematic of the delay circuit 12, and the digital filter circuit 14 illustrated in block form in FIG. 1. The digital data output from the A/D converter 10 is applied to the D0–D7 inputs of a delay latch 100. The outputs Q0–Q7 of the delay latch 100 are connected to the inputs D0–D7 of a two clock delay latch (2D) 102. The digital composite video data following this path is delayed three clock intervals of the PHASED 4fsc sampling clock fed to the A/D converter 10, to compensate for the delay of the write phase processing.

The digital filter 14 illustrated in FIG. 6, is configured as a transversal filter, where a plurality of samples around the present filtered samples are processed according to a sampling equation. As previously described, the sampling equation for the filter of FIG. 6 is:

$$SAf = \tfrac{1}{2}Sf-4 + 0Sf-3 + Sf-2 + 0Sf-1 - \tfrac{1}{2}Sf0$$

where Sf0 is the present data sample entering latch 100 and Sf−4 is the filtered data sample entering latch 118.

In accordance with the equation, the data output from the A/D converter 10 is applied to the D0–D7 inputs of a latch 104 and to the A0–A7 inputs of a multiplexing switch 106 of the bandpass filter 14. The inverted outputs *Q0–*Q7 of the latch 104 are used to feed the first stage of the digital filter 14, which comprises a 8-bit adder 108 and, in particular, are applied to the A1–A7 inputs of the adder 108, and to the carry-in input CI. Thus, the adder 108 has as one addend, ½ the inversion of the input sample. This addend is summed with an input received at the B1–B7 inputs of the adder 108, which second addend is the Q0–Q7 output of the multiplexing switch 106. Multiplexing switch 106 is in the operate position when a switch 107 grounds its S input.

The result, $-\tfrac{1}{2}Sf-4$, of the addition by adder 108 corresponds to the first term of the prior equation, and is clocked into a 2 delay (2D) latch 110 at the next BPCLK 4fsc clock pulse supplied from the switch 40 of FIG. 1, during the burst interval. After being delayed for two clock cycles in the latch 110, which conforms to the zero coefficient of the second term, the sample value is added via inputs A1–A7 to the present sample input Sf−2 (the center term of the equation) via the B1–B7 inputs of the adder 112. The results of the addition from adder 112 are transmitted via 01–07 outputs to the D0–D7 inputs of a 2D latch 114. The latch 114 will, after two BPCLK 4fsc clock pulses, corresponding to the zero coefficient of the fourth term, transfer the second partial sum to the inputs A1–A7 of a third adder 116. The final addition in adder 116 is a combination of the partial sums from adders 108 and 112, added to ½ the output of the inverting outputs *Q0–*Q7 of latch 104 applied to the adder 116 at its B1–B7 inputs, and corresponding to the last term of the equation. The resulting summation from adder 116 then is stored in a delay latch 118 pending the next BPCLK 4fsc clock pulse, which supplies the filtered data Sf.

Figure 7:
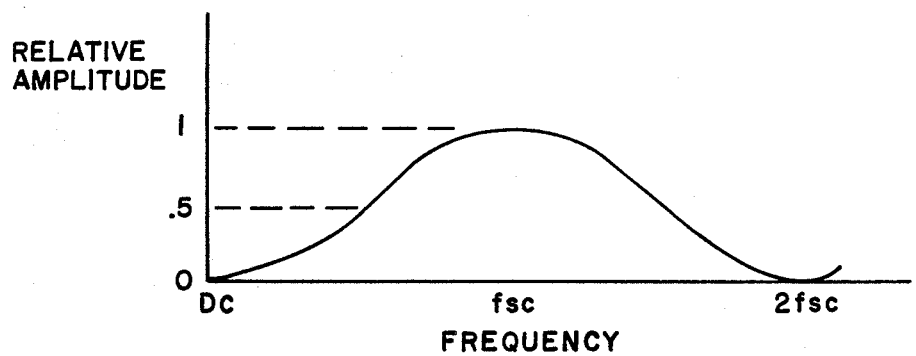
FIG. 7 is a graph of relative signal amplitude as a function of frequency for the digital bandpass filter of FIGS. 1 and 6.

The digital filter 14 has an amplitude minimum (zero) for DC, as well as for the second harmonic of the subcarrier frequency 2fsc. The amplitude maximum (pole) for the filter is at fsc. This frequency response is shown in FIG. 7 and is termed a raised sine response. The removal of any DC frequency from the converted samples, removes the errors in the pedestal voltage such that shifts in this high amplitude, relatively constant, level do not affect the phase measurements. Further, the second harmonic frequencies of the subcarrier which affect the slopes and gains of the subcarrier at zero crossings is filtered out by the notch in the filter at 2fsc. Thus, the data gathered at the zero crossings will be more precise than if measurements were taken with second harmonic noise contained therein.

The digital filter 14 acts as a bandpass filter passing frequencies of video data above DC and below 2fsc. Although all input video data is filtered, it is preferably only the burst data which will be selected and used as the filtered data. However, other uses of the filtered bandpass video data can be contemplated. Further, although a specific transversal filter configuration and coefficients are described herein by way of example only, it is understood that other filter configurations which have the requisite frequency parameters may be employed. In addition, although a digital filter is described herein by way of example, an analog filter implementation may be used instead to remove the pedestal and second harmonic noise distortion. However, analog filtering has the disadvantage of causing drift with time and temperature.

The burst store 30 and fsc generator 32 of FIG. 1 will now be more fully described with respect to the electrical schematic of FIG. 8. The burst store 30 and the fsc generator 32 combine to provide means for generating an oscillator clock signal at frequency fsc which is locked to the digital samples of the burst waveform from the digital bandpass filter 14. It should be understood that errors due to pedestal level distortion, and noise at 2fsc and above, have been substantially removed from the burst samples by the digital bandpass filter 14. These burst samples are used when the VCO circuit of FIG. 11 is not locked to subcarrier, in order to generate the BURST fsc clock signal which is used as an alternative to the VCO fsc clock signal for generating the PHASED 4fsc signal via the switch 26 and circuit 28 (FIGS. 1 and 10). Thus, the burst store circuitry is responsive to the LOCK signal of previous mention, which is supplied by the VCO circuit of FIG. 11 to the switches 40 and 26, to indicate a locked, or unlocked, condition.

The burst samples are continuously supplied to the burst store circuitry, when the VCO circuit 70 is in unlocked mode, through a latch 200 which is clocked by the BSCLK 4fsc signal. The BSCLK clock is gated during the burst interval by the burst timing circuit 38 (FIGS. 1,9) and thus, only samples during this interval enter latch 200. A memory address counter 244, clocked with the BSCLK clock signal, sequentially counts to generate addresses 0-15 for a random access memory (RAM) 208. A latch 242, which receives the Q0-Q3 outputs of the counter 244 corresponding to the addresses 0-15, applies the address signals to the A0-A3 address inputs of the RAM 208. When the write enable input WE of the RAM 208 is a high logic level, samples which are clocked from latch 200 through latch 206 will be stored at addresses corresponding to the output of latch 242.

Latch 242 is clocked continuously by the BSCLK signal and, therefore, is either loading samples from the latch 206 into one of sixteen storage locations, or is reading out one of the sixteen stored burst samples, based upon the value of the address. The burst samples are read out from the RAM 208 via a read enable signal RE from the *Q output of a bistable 252, and are transferred from its Q0-Q7 outputs to the D0-D7 inputs of a latch 210.

As an alternative to being written into the RAM 208 and transferred to latch 210 during the VCO circuit 70 unlocked mode, and during the burst interval, the burst samples pass through a path comprising two latches 202 and 204, during clocking intervals of the BSCLK signal. The parallel paths coincide by connecting the Q0-Q7 outputs of latch 204 and latch 210 to the D0-D7 inputs of a latch 212. Depending upon which latch *OE input is enabled, burst samples will either enter the latch 212 from one path or the other. The choice of the path is made by the state of the D-type bistable 252, which has its Q output connected to the *OE input of the latch 204, and its *Q output also connected to the *OE input of the latch 210.

The state of bistable 252 depends, in turn, upon the output of the inverted overflow OV output of a memory enable counter 246, coupled to its D input via an inverter 248. The inverter 248 output also is coupled back to the count enable input CE of the counter 246. A low logic level output from the inverter 248 indicates a "refresh" mode of operation of the burst store, and a high logic level output from inverter 248 indicates a "store" mode of operation. When the REFRESH signal is true, the RAM 208 is continuously loaded with incoming burst data samples. However, when REFRESH is a logical not-true, the contents of the RAM 208 are not refreshed and it, in essence, becomes a read only memory which supplies the same contents when read out.

In general, the burst store 30 operates in the read mode of operation, which is determined by the counter 246 having an overflow indication on its OV output. This produces a high logic level on the output of the inverter 248. The overflow indication further passes through inverter 248 to disable the count enable input CE of the counter 246. In this mode of operation, the output of latch 210 is enabled to provide burst samples which are read from RAM 208 at the clock rate via the RE signal from the *Q output of the bistable 252, at the addresses which counter 244 is supplying.

For the refresh, or the store, modes of operation, a REFRESH signal is brought to a logic level high, or a low, respectively, and is applied to the D input of a bistable 254. The BURST FLAG signal clocks a D-type bistable 264 via an inverter 260, and has its D input tied to a positive voltage +V through a resistor 262. A multiple output bistable 268 which is used as a timing delay, resets the bistable 264 four BSCLK pulses later via its Q3 output and an inverter 266, and the transition of the Q4 output of bistable 268 clocks the bistable 254.

The transition of the Q8 output of bistable 268 further causes the *Q output of a bistable 270 to clear the counter 244, while the counter 246 is cleared by the Q output of bistable 270 via a NAND gate 250 and the Q output of the bistable 254. This is the start of a store cycle for the RAM 208, and the counter 244 is initialized to the address starting memory. When counter 246 is cleared, the overflow signal resets and allows the counter to be incremented. Counter 246 is clocked at the BSCLK 4fsc clock rate and counts sixteen of these cycles before the overflow signal again is generated and inhibits its advancement. If, when the BURST FLAG was detected and clocked into bistable 254, the REFRESH signal was at a high level, then the output of the bistable 252 disables the output of latch 210 and the RE input of RAM 208, and enables the output of latch 204 via the bistable 252. Further, when the Q output of the bistable 252 makes a transition to a low logic level, the write enable input WE is enabled such that samples from latch 206 are stored in the RAM 208.

Because there are previously stored samples in the RAM 208, during the refresh time the BURST fsc clock must be generated from another set of burst samples, and the output of latch 204 is enabled while loading RAM 208 with the new set of samples. The BURST fsc signal is generated from the samples as they are obtained from the burst waveform. After sixteen such samples have been loaded, as counted by counter 246, the output of bistable 252 is disabled by the overflow OV output of counter 246 via inverter 248.

Whether the burst samples come through the first path of latches 200, 202, and 204, or through the second path of latch 206, RAM 208, and latch 210, the output of latch 212 applies the samples to a D/A converter 214 to produce an output whose voltage is a representation of the digital sample values at the 4fsc clock rate. This digital subcarrier signal is applied to a shaping amplifier comprising NPN transistor 220 and input circuitry including resistor 216, capacitor 218, and inductor 222. The output of the shaping amplifier is bandpassed by a filter 224 which also introduces a predetermined phase shift into the signal. The phase shifted and shaped subcarrier signal is then applied to an emitter follower 230, and thence to a comparing amplifier 238 which generates a logic level subcarrier. Thus, the fsc generator 32 receives the digital samples output from latch 212 and generates a subcarrier signal of frequency fsc at the output of its circuitry.

Thus, an oscillator signal at frequency fsc is generated which is phased to the burst waveform, and which can be used as an alternative to the VCO 4fsc oscillator signal when the latter is unlocked, as mentioned in FIG.

1 and further described in FIG. 10. Upon the occurrence of the REFRESH signal, the present burst samples are gated not only to be stored in the RAM 208, but also to generate the BURST fsc signal while the RAM is being loaded.

Figure 9:
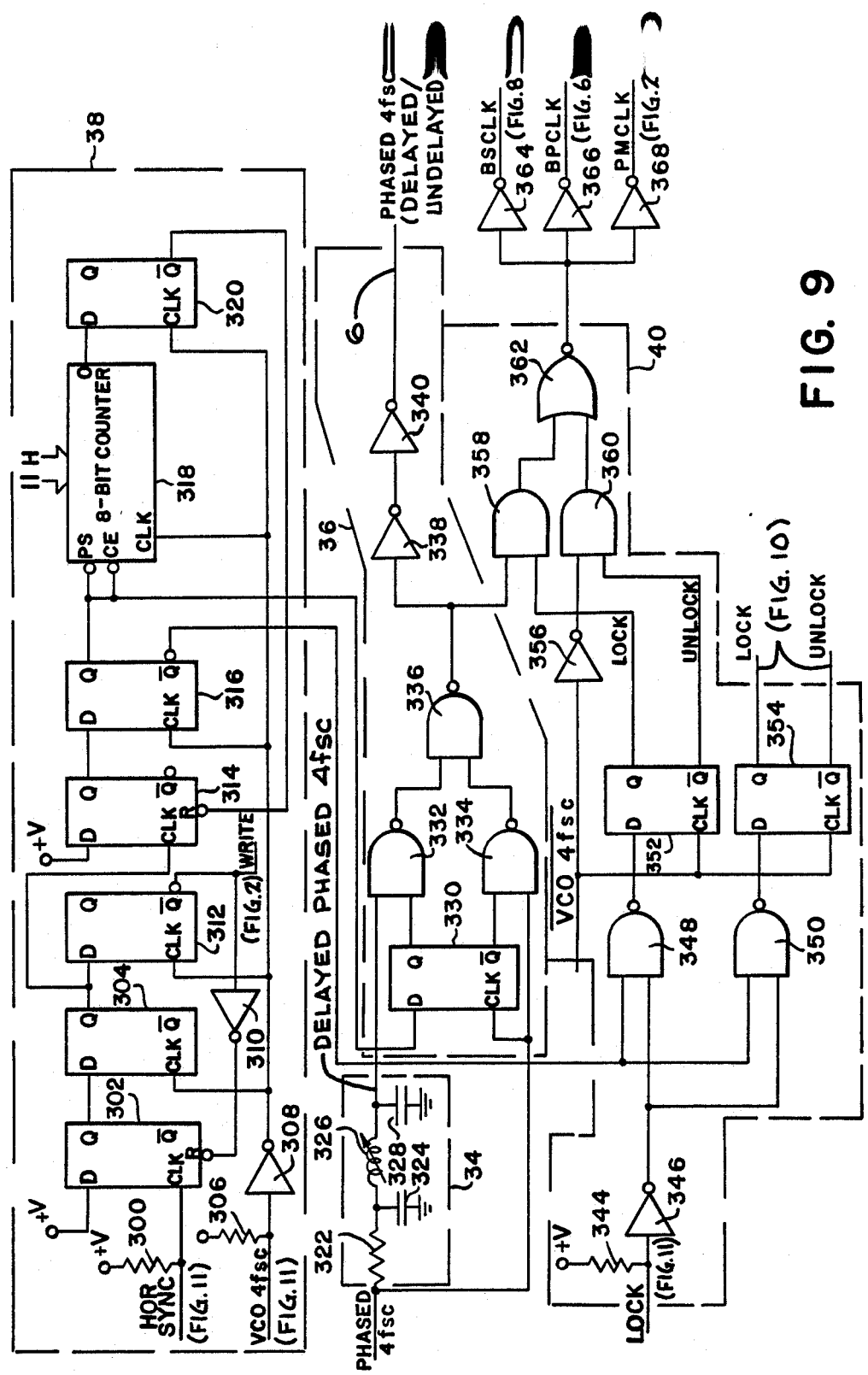
FIG. 9 is an electrical schematic of the burst timing circuit and the switches of FIG. 1, used to change the sampling clock phase and to provide internal clocks to the circuits of FIGS. 2, 6 and 8.

FIG. 9 illustrates the burst timing circuit 38, switches 40, 36, and an input stage of switch 26. The burst timing interval is generated by the burst timing circuit 38 which includes a series of D-type bistables 302, 304, 312, 314, 316, an 8-bit counter 318, and a D-type bistable 320. The HOR SYNC signal from the VCO circuit of FIG. 11, clocks bistable 302 to set bistable 304 at the beginning of each horizontal line. The Q output of bistable 304 is delayed three clock intervals in bistable 312 before generating the delayed WRITE pulse, which is supplied to the measurement timing circuit 145 of FIG. 2. The *Q output from the bistable 312 additionally resets the bistable 302 via an inverter 310. The WRITE pulse is generated by delaying the HOR SYNC signal for a couple of 4fsc clock pulses, and is used in FIG. 2 to produce the phase measurement clocks which input the burst samples. The sample that starts the phase measurement will be the first positive crossing after the BURST FLAG and not the one which generates the flag. In this manner, the first zero crossing of the burst signal is eliminated from the measurement, and noise and other distortions thereon are eliminated from the phase measurement.

The Q output of the bistable 304 further begins a count in the counter 318 which starts at the beginning of the burst interval and ends at the termination of that interval. The burst interval is nine subcarrier cycles in duration and thus, the counter 318 is preset early by the Q output of bistable 316, to count from a number which is 36 clock pulses from overflow (9 cycles×4 samples/cycle). Once the counter 318 has recorded the nine subcarrier cycles, that is, is at the end of burst, it overflows and sets bistable 320 causing bistable 314 to reset. The burst timing circuit remains reset until another HOR SYNC signal appears indicating the start of another horizontal video line.

The Q output of bistable 316, therefore, goes to a high logic level before the beginning of the burst interval and does not go low until the end of the burst interval. Conversely, the *Q output of bistable 316 makes a transition to a low logic level before the beginning of the burst interval and does not switch to a high logic level until its end. The switch 36 uses the burst interval signal from the Q output of bistable 316 to switch between the phased 4fsc signal and that signal delayed by 33°. The phased 4fsc signal enters the phase delay circuit 34 which comprises a resistor 322, capacitors 324, 328, and inductor 326. The phase delay circuit inserts a precision 33° phase lag between its input and output, which is received at one input of a NAND gate 332. The undelayed phased 4fsc signal is applied to one input of a NAND gate 334. The other inputs of the NAND gates 332 and 334 are connected to the Q output and *Q output of a bistable 330, respectively, which is clocked by the phased 4fsc signal. The burst interval signal is applied to the D-input of the bistable 330 to cause the NAND gates 332, 334 to mutually exclusively gate or disable the delayed and undelayed 4fsc clock signals therethrough.

NAND gate 336 receives the outputs of NAND gates 332 and 334 and acts as a negative true input OR gate. The output of NAND gate 336 is buffered twice in inverters 338 and 340 before being output on the line 6 as the phased 4fsc clock which is used to sample the analog composite color video signal. Because the Q output of bistable 316 is a high logic level during the burst interval, the delayed phased 4fsc clock signal will pass through gate 332 and the undelayed phased 4fsc clock signal will be blocked from passing through gate 334 at this time. At other times, the converse is true; the phased 4fsc clock signal will pass through gate 334 while gate 332 will block the delayed phased 4fsc clock signal. Thus, the sampling clock of the A/D converter 10 will be delayed 33° with respect to the subcarrier signal during sampling of the burst and in phase otherwise. This will permit a sampling of the video signal on the I and Q axes which will facilitate error concealment at the 4fsc sampling rate in a digital recorder.

Switch 40 includes an inverter 356 coupled to the VCO 4fsc signal, AND gates 358, 360, and NOR gate 362 When the system VCO is unlocked, the clock signals to the bandpass filter 14, the burst store 30, and the phase measurement circuit 16 (BPCLK, BSCLK, and PMCLK, respectively) are switched between the delayed phased 4fsc signal as output by NAND gate 336 and the inverted VCO 4fsc signal of inverter 356. The selection of which signal is used i dependent upon the state of a bistable 352 which receives the output of a NAND gate 348. The BSCLK, BPCLK and PMCLK clock signals are supplied via respective inverters 364, 366 and 368. The BCCLK signal is used in the burst store and fsc generator circuitry of FIG. 8. The BPCLK signal is used in the bandpass filter circuitry of FIG. 6, and the PMCLK signal is used in the measurement timing circuitry 145 of FIG. 2.

The logic state of bistable 352 depends in turn upon the output logic level of the NAND gate 348, which combines the burst interval signal from the *Q output of bistable 316 and the LOCK signal (FIGS. 1, 11) via input resistor 344 and inverter 346. If the system is locked, such that the phase error is not greater than a predetermined amount, then at times other than the burst interval the output of NAND gate 348 will be a low logic level. This low logic signal will select the PHASED 4fsc clock for the generation of the internal clocks. However, if the system becomes unlocked, the oscillator signal VCO 4fsc will be chosen for supplying the internal clocking signals only during the time of burst store refresh. The rest of the time, burst store provides clocks. Similarly, the bistable 354 provides switching signals to switch 26 of FIGS. 1,10, which determines which of the oscillator signals VCO fsc or BURST fsc is supplied to the phase shifter/frequency multiplier circuit 28. At all times other than the burst interval, if the system is locked, the switch 26 will apply the VCO fsc signal to the input of the phase shifter/frequency multiplier circuit 28. However, if the system is unlocked, then a high output from a NAND gate 350 will set the bistable 354 and BURST fsc is applied to the phase shifter/frequency multiplier circuit 28. Although two bistables (352, 354) are depicted herein, generating two sets of lock/unlock control signals, a single bistable may be used which generates lock/unlock signals, or which generates the two high and low logical states on a single (LOCK) signal.

FIG. 10 is a detailed electrical schematic of the phase shifter/frequency multiplier circuit 28, which includes one input from a NOR gate 402 of the switch 26 (FIG. 1), another input consisting of the PHASE ERROR signal on line 4 from the error integrator 24 (FIG. 2), and an output therefrom of the PHASED 4fsc sampling clock signal which is supplied to the switch 36 and the phase delay circuit 34 (FIG. 9). The phase shifter/frequency multiplier circuit 28 is comprised of five stages 406, 408, 410, 412, and 414. Stage 406 is a 90° phase shifter, which is servoed by the PHASE ERROR signal, which is a DC signal affecting the bias of a NPN transistor 416. The output of the phase shifter 406 is transmitted to the input of an identical phase shifter 40. This phase shifter is used only in centering servo error.

Stages 410 and 412 are identical amplification and active filtering stages which take a 4fsc signal from the phase shifter 408 and apply it to shaper amplifier 414. Shaper amplifier 414 squares the signal and presents the amplified PHASED 4fsc clock to the switch 36 which, in turn, supplies the delayed and undeayed PHASED 4fsc sampling clock to the A/D converter 10 on line 6, at the correct logic and phase level.

The analog phase shifter/frequency multiplier circuit 28 described herein by way of example, to generate the PHASED 4fsc clock, may be replaced by all digital circuitry that performs the same functions of shifting a subcarrier signal in response to the phase error signal, while providing a multiplication function to generate the particular sampling clock frequency desired, for example 3fsc, 4fsc, 8fsc, etc.

Figure 12:
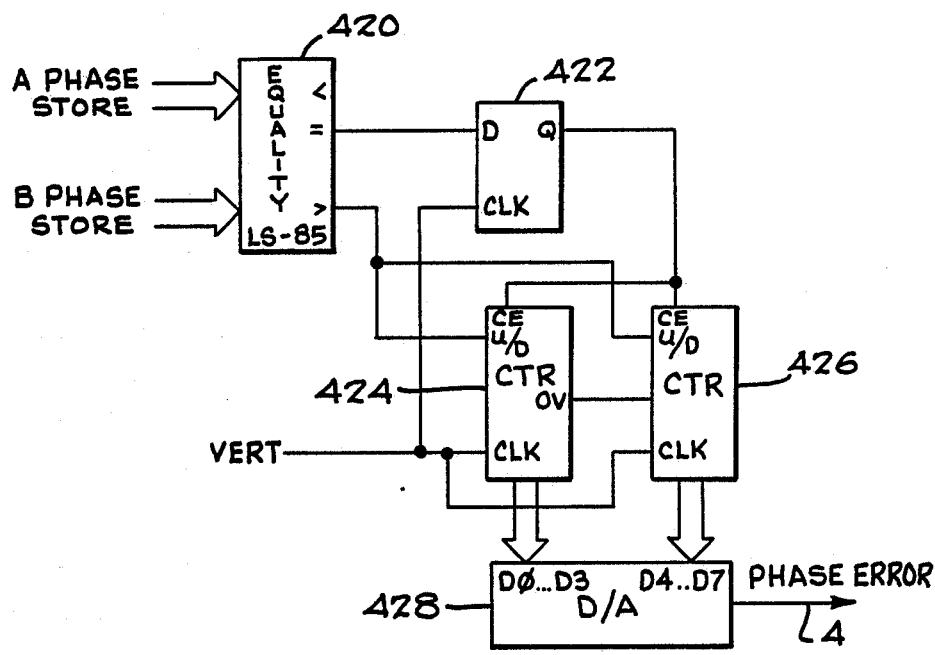
FIG. 12 is a block diagram of a digital circuit equivalent of the relational circuit 22 and error integrator 24 of FIGS. 1 and 2.

FIG. 12 illustrates by way of example, a digital equivalent of the relational circuit 22 and 8-bit sample data from the A and B phase stores 18 and 20, respectively, are supplied to an equality circuit 420 such as, for example, multiple LS - 85. The function of circuit 420 is to compare the two digital values and provide logic states at respective outputs, which indicate the difference and/or equality of the two values. To this end, the equality circuit 420 includes an "equal" output which is coupled to the D input of a D-type bistable 422, and a "greater-than" output which is coupled to the up/down inputs of a pair of 4-bit up/down counters 424, 426. The Q output of the bistable 422 is coupled to the inhibit inputs of the counters. A vertical sync signal clocks the bistable 422 and the counters 424, 426 at the vertical rate. The 4-bit digital values, representing the phase difference between the sets of data samples from the A and B stores, are supplied to D/A converter 428. The resulting D/A output on the line 4 is the analog phase error signal of previous description.

In operation, the greater-than output of the equality circuit 420 provides a logical high or low to direct the counters to count up or down, respectively, depending on the relative values of the incoming sets of sample data from the A and B, phase stores. At such time as the values become equal due to the action of the servo loop, the equal output of the equality circuit 420 causes the bistable 422 to inhibit further counting by the counters, and the value of the phase error signal is maintained until the arrival of the next vertical sync signal. Thus, changes in the phase error signal are made during vertical blanking and do not disturb the video picture.

While a preferred embodiment and some alternatives, of the invention have been illustrated, it will be obvious to those skilled in the art that further modifications and changes may be made thereto without departing from the spirit and scope of the invention as defined in the appended claims. Thus the present sampling clock generator circuit may be used in the PAL color television standard system as previously discussed, by omitting the phase delay circuit 34 of FIGS. 1,9 and using the respective sampling frequencies, etc., of the PAL system. In the PAL system, amples are taken on every other line (which are 180° apart in phase, and correspond thus to the alternating phase on successive lines in NTSC). The samples then are updated on every fourth line, rather than every other line as in the NTSC standard particularly described herein. Thus in PAL, as in NTSC, one set of the burst data samples are sampled, and averaged, on a horizontal line to provide a first sampling phase error value, and the second set of burst data samples are sampled and averaged on the same horizontal line to provide the second phase error value. This is true in both standards, even though the samples are taken from every other line in PAL. Then, in both standards, the first set of samples from the line are updated on one horizontal line, and the second set of samples from the same line are updated on the "alternate" line relative to the line pattern in which the samples are taken. Thus, in PAL, each set of samples are from a selected line, and are updated on alternate lines of said selected line.

What is claimed is:

1. A method for removing sampling clock phase error relative to color burst when sampling an analog color television signal, comprising:
   obtaining digital samples of the color burst at similar phase locations along a horizontal line of the analog color television signal via the sampling clock;
   averaging a plurality of the digital burst samples taken at first similar phase locations of said color burst to form a first averaged sampling phase signal;
   averaging a plurality of the digital burst samples taken at second similar phase locations of said color burst to form a second averaged sampling phase signal;
   determining the difference between the first and second averaged sampling phase signals to provide a phase error signal indicative of the difference; and
   adjusting the phase of the sampling clock in response to the phase error signal.

2. The method of claim 1 wherein the steps of averaging include:
   selecting the plurality of digital burst samples at the first similar phase locations corresponding to 0° crossings, and at the similar selected phase locations corresponding to 180° crossings, respectively, of the color burst.

3. The method of claim 2 wherein:
   the step of selecting includes, sampling the color burst at least two times at the 0° crossing of burst and at least two times at the 180° crossing of burst on a respective horizontal line; and
   the steps of averaging further include, adding the 0° crossing samples together, adding the 180° crossing samples together, and dividing each sum of samples by the same number as the number of samples taken.

4. The method of claim 3 including:
   providing a reference subcarrier signal which is locked to the color burst; and
   shifting the phase of the reference subcarrier signal in response to the phase error signal to provide a phased 4X subcarrier signal for use in the step of adjusting the phase of the sampling clock.

5. The method of claim 3 including:
   updating one of the sets of averaged samples on one horizontal line, and updating the other of the sets of averaged samples on an alternate horizontal line, to remove nonlinearity errors.

6. The method of claim 5 wherein the step of determining includes:
converting the updated sets of averaged samples to respective analog signals to provide a difference analog signal; and
integrating the difference analog signal to provide the phase error signal.

7. The method of claim 1 including:
filtering said digital burst samples at DC and at two-times subcarrier frequencies prior to averaging said burst samples to remove corresponding frequency components which cause phase measurement 8. The method of claim 7 including:
storing the filtered burst samples during color burst intervals; and
generating a burst subcarrier signal from the stored burst samples.

9. The method of claim 8 including:
providing a reference subcarrier signal which is locked to the color burst; and
shifting the phase of the burst subcarrier signal, or the phase of the reference subcarrier signal, in response to the phase error signal to provide a phased 4X subcarrier signal for use in the step of adjusting the phase of the sampling clock.

10. The method of claim 8 including:
delaying the phase of the phased 4X subcarrier signal; and
selectively applying the delayed phased 4X subcarrier signal during a color burst interval, or the phased 4X subcarrier signal during the remaining horizontal line interval, as the sampling clock signal.

11. The method of claim 1 wherein the step of determining includes:
converting the difference between the first and second averaged sampling phase signals to a sampling phase difference signal; and
integrating the sampling phase difference signal over a selected time interval of the television signal to provide the phase error signal.

12. The method of claim 1 in a NTSC color television standard system, including:
temporarily storing the first and second averaged sampling phase signals; and
updating the first averaged sampling phase signal during one horizontal line, and updating the second averaged sampling phase signal on an alternate horizontal line, to remove nonlinearity errors.

13. The method of claim 1 in a PAL color television standard system, including:
obtaining the digital samples of the color burst from every other horizontal line;
temporarily storing the first and second averaged sampling phase signals from each of said every other line; and
updating the first averaged sampling phase signal during one of said every other line, and updating the second averaged sampling phase signal on an alternate line of said every other line.

14. A method for removing sampling clock phase error relative to burst subcarrier when sampling an analog television signal, when the sampling clock is in phase with the burst subcarrier and is generating a repeating digital relationship, namely that data samples at 0° crossings of the burst will be equal to data samples at 180° crossings of the burst, comprising:

measuring the equality between a plurality data samples at said 180° crossings;
generating a phase error signal which is proportional to the difference between the two pluralities of data samples; and
adjusting the sampling clock phase in response to the phase error signal to reduce said difference to zero, to remove the sampling clock phase error.

15. A circuit for removing the sampling clock phase error relative to color burst of a sampling clock which is providing data samples of an analog color television signal, when the sampling clock is in phase with the burst subcarrier and is generating a repeating digital relationship, namely that data samples at 0° crossings of the burst will be equal to data samples at 180° crossings of the burst, comprising:
means for measuring the equality between a selected plurality of data samples at the 0° crossings and a selected plurality of data samples at the 180° crossings;
means responsive to the measuring means for generating a phase error signal indicative of any difference between the two selected pluralities of data samples; and
means coupled to the generating means for servoing the sampling clock phase in response to the phase error signal to reduce said difference to zero.

16. The circuit of claim 15 wherein the measuring means includes:
means for averaging the plurality of 0° crossing data samples, and the plurality of 180° crossing data samples, to provide respective first and second sampling phase signals; and
means for comparing the first and second sampling phase signals to provide a phase difference signal corresponding to said difference.

17. The circuit of claim 16 including:
means coupled to the averaging means for updating the plurality of 0° crossing data samples on a horizontal line, and for updating the plurality of 180° crossing data samples on an alternate horizontal line, to provide the respective first and second sampling phase signals to said comparing means.

18. The circuit of claim 17 further including second means coupled to the averaging means for converting the first and second sampling phase signals to corresponding first and second analog signals, said analog signals being supplied to the generating means.

19. The circuit of claim 16 wherein the generating means includes, means for sensing the phase difference between the first and second sampling phase signals and for generating the phase error signal in response to the sensed phase difference.

20. The circuit of claim 19 wherein the sensing means includes:
digital-to-analog converter means coupled to the updating means, for supplying first and second analog signals from the first and second sampling phase signals; and
balanced integrator means coupled to the converter means for generating the phase error signal in response to the first and second analog signals.

21. The circuit of claim 15 wherein the servoing means includes:
means for supplying a subcarrier-related clock signal; and
phase shifting means for adjusting the phase of the subcarrier-related clock signal in response to the phase error signal to provide the sampling clock with phase error removed.

22. The circuit of claim 15 including:
means receiving the data samples, for selectively filtering the digital data samples at DC and at two-times the burst subcarrier prior to supplying the data samples to the equality measuring means.

23. A circuit for removing the sampling clock phase error relative to the color burst, of an A/D converter which is supplying the burst samples of an analog color television signal, comprising:
phase measurement means for averaging first and second sets of a plurality of burst samples taken at respective phase locations of burst signal along a horizontal line, and for providing first and second sampling phase signals;
means coupled to the phase measurement means for generating a phase error signal from the difference of the first and second sampling phase signals; and
means for adjusting the phase of the sampling clock in response to the phase error signal to remove the sampling clock phase error.

24. The circuit of claim 23 wherein the phase measurement means includes:
means for averaging the first set of burst samples from 0° crossings of the color burst, and the second set of burst samples from 180° crossings of the color burst; and
means for storing the averaged 0° crossing data samples as a first phase error value and the averaged 180° crossing data samples as a second phase error value; and
means for selectively reading out the stored first and second phase error values.

25. The circuit of claim 24 wherein the generating means includes:
differencing means coupled to the reading out means for generating a phase difference signal in response to the selectively read out first and second phase error values; and
means coupled to the differencing means for generating the phase error signal from the phase difference signal.

26. The circuit of claim 24 wherein the reading out means includes:
latch means coupled to the storing means for reading out the first phase error value on a horizontal line, and for reading out the second phase error value on an alternate horizontal line, said values being supplied to the generating means.

27. The circuit of claim 26 wherein the generating means includes:
converter means coupled to the latch means for supplying first and second analog signals corresponding to the first and second phase error values, respectively; and
integrator means for generating the phase error signal in response to the first and second analog signals.

28. The circuit of claim 23 wherein the phase measurement means includes:
means for bandpass filtering the burst samples at selected frequencies to remove DC components and second harmonic distortion;
averaging means coupled to the filtering means for performing the averaging of the first and second sets of burst samples; and
means coupled to the averaging means for updating the first sampling phase signal on a selected horizontal line, and the second sampling phase signal on an alternate line of the selected horizontal line, to remove nonlinearity errors.

29. The circuit of claim 28 wherein the generating means includes:
means coupled to the updating means for supplying first and second phase difference signals representative of the first and second updated sampling phase signals; and
means for sensing the difference between the first and second phase difference signals and for generating the phase error signal in response thereto.

30. The circuit of claim 29 wherein:
said updating means includes a pair of digital latches selectively clocked on alternate horizontal lines;
said supplying means includes digital-to-analog converters coupled to the digital latches;
means includes a balanced integrating amplifier.

31. The circuit of claim 28 including:
means for detecting the occurrence of a locked/unlocked circuit condition;
means for storing the filtered burst samples during the burst interval; and
means coupled to the storing means for producing a burst subcarrier signal locked to burst subcarrier during the unlocked circuit condition.

32. The circuit of claim 31 including:
means for providing a reference subcarrier signal locked to burst; and
wherein the adjusting means includes means coupled to the producing means for shifting the phase of either the burst subcarrier signal, or the reference subcarrier signal, in response to the phase error signal, to provide a phased 4X subcarrier signal.

33. The circuit of claim 32 including:
phase delay means coupled to the shifting means for supplying a phase delayed 4X subcarrier signal;
means for indicating the occurrence of the burst interval; and
first switch means for supplying, in response to the indicating means, the 4X subcarrier signal, or the phase delayed 4X subcarrier signal, to the A/D converter as the sampling clock.

* * * * *